US007634361B2

(12) United States Patent
Levesque et al.

(10) Patent No.: US 7,634,361 B2
(45) Date of Patent: Dec. 15, 2009

(54) EVENT ALERT SYSTEM AND METHOD

(75) Inventors: Michael E. Levesque, North Kingstown, RI (US); Richard T. Karon, Jamestown, RI (US)

(73) Assignee: Raytheon Company, Waltham, MA (US)

( * ) Notice: Subject to any disclaimer, the term of this patent is extended or adjusted under 35 U.S.C. 154(b) by 654 days.

(21) Appl. No.: 11/126,560

(22) Filed: May 11, 2005

(65) Prior Publication Data

US 2005/0264412 A1 Dec. 1, 2005

Related U.S. Application Data

(60) Provisional application No. 60/570,531, filed on May 12, 2004.

(51) Int. Cl.
*G06F 15/00* (2006.01)

(52) U.S. Cl. ......................... 702/19; 702/179; 702/182; 702/183; 702/185; 702/188; 701/117; 701/207; 701/210; 706/12; 706/14; 706/46; 340/293; 340/989; 713/200

(58) Field of Classification Search ................... 702/73, 702/78, 79, 179, 182, 185, 186, 188; 709/202, 709/203, 224; 706/46, 12, 14; 455/9, 11.1; 340/3.1, 310.11, 310.14, 500, 989, 293; 713/200; 701/117, 207, 210
See application file for complete search history.

(56) References Cited

U.S. PATENT DOCUMENTS

| | | | | | |
|---|---|---|---|---|---|
| 4,630,110 | A | * | 12/1986 | Cotton et al. | 348/153 |
| 5,146,209 | A | | 9/1992 | Beghelli | |
| 5,398,277 | A | | 3/1995 | Martin, Jr. et al. | |
| 5,636,245 | A | * | 6/1997 | Ernst et al. | 375/259 |
| 5,689,442 | A | * | 11/1997 | Swanson et al. | 380/241 |
| 5,815,075 | A | | 9/1998 | Lewiner et al. | |
| 5,974,457 | A | * | 10/1999 | Waclawsky et al. | 709/224 |
| 6,084,510 | A | | 7/2000 | Lemelson et al. | |
| 6,114,967 | A | | 9/2000 | Yousif | |
| 6,229,432 | B1 | * | 5/2001 | Fridley et al. | 340/310.14 |
| 6,392,536 | B1 | | 5/2002 | Tice et al. | |
| 6,466,258 | B1 | | 10/2002 | Mogenis et al. | |
| 6,518,878 | B1 | | 2/2003 | Skoff | |

(Continued)

FOREIGN PATENT DOCUMENTS

WO WO 01/26068 4/2001

(Continued)

OTHER PUBLICATIONS

Levesque; "Event Detection Module;" U.S. Appl. No. 11/126,559, filed May 11, 2005.

(Continued)

*Primary Examiner*—Carol S Tsai
(74) *Attorney, Agent, or Firm*—Daly, Crowley, Mofford & Durkee, LLP

(57) ABSTRACT

An event alert system and method provide event detection modules that communicate detected events with a central command center. The central command center combines the detected events with related data to provide an intelligent response signal, and communicates the intelligent response signal to event responders. The event alert system also provides an event detection module having event sensors able to detect a variety of types of events.

26 Claims, 7 Drawing Sheets

U.S. PATENT DOCUMENTS

| | | | | |
|---|---|---|---|---|
| 6,556,951 | B1 * | 4/2003 | Deleo et al. | 702/183 |
| 6,653,945 | B2 | 11/2003 | Johnson et al. | |
| 6,693,531 | B2 | 2/2004 | Grauer | |
| 6,735,630 | B1 | 5/2004 | Gelvin et al. | |
| 6,885,299 | B2 | 4/2005 | Cooper et al. | |
| 6,972,677 | B2 | 12/2005 | Coulthard | |
| 6,999,876 | B2 * | 2/2006 | Lambert et al. | 702/2 |
| 7,096,125 | B2 | 8/2006 | Padmanabhan et al. | |
| 7,116,246 | B2 | 10/2006 | Winter et al. | |
| 7,421,334 | B2 * | 9/2008 | Dahlgren et al. | 701/117 |
| 2002/0044533 | A1 | 4/2002 | Bahl et al. | |
| 2002/0084918 | A1 | 7/2002 | Roach | |
| 2002/0158775 | A1 | 10/2002 | Wallace | |
| 2003/0004965 | A1 * | 1/2003 | Farmer et al. | 707/104.1 |
| 2003/0058102 | A1 | 3/2003 | Kimmet | |
| 2003/0069002 | A1 | 4/2003 | Hunter et al. | |
| 2003/0122677 | A1 | 7/2003 | Kail, IV | |
| 2003/0125998 | A1 * | 7/2003 | McKenney et al. | 705/7 |
| 2003/0148672 | A1 | 8/2003 | Henry et al. | |
| 2003/0216837 | A1 | 11/2003 | Reich et al. | |
| 2004/0004543 | A1 | 1/2004 | Faulkner et al. | |
| 2004/0012491 | A1 | 1/2004 | Kulesz et al. | |
| 2004/0015336 | A1 * | 1/2004 | Kulesz et al. | 703/11 |
| 2004/0041702 | A1 | 3/2004 | Toulmin et al. | |
| 2004/0073459 | A1 | 4/2004 | Barthell | |
| 2004/0199785 | A1 * | 10/2004 | Pederson | 713/200 |
| 2004/0239500 | A1 * | 12/2004 | Berry | 340/540 |
| 2004/0257208 | A1 * | 12/2004 | Huang et al. | 340/426.1 |
| 2006/0015254 | A1 * | 1/2006 | Smith | 702/3 |

FOREIGN PATENT DOCUMENTS

| | | | |
|---|---|---|---|
| WO | WO 2004/010398 | A1 | 1/2004 |
| WO | WO 2004/023413 | A2 | 3/2004 |
| WO | WO 2004/023413 | A3 | 3/2004 |
| WO | WO 2005/081963 | A2 | 9/2005 |
| WO | WO 2005/081963 | A3 | 9/2005 |
| WO | WO 2006/083268 | A1 | 8/2006 |

OTHER PUBLICATIONS

Oak Ridge National Laboratory Fact Sheet; SensorNet; Mar. 22, 2004; website www.sensornet.gov; 2 sheets.

Parson; "SensorNet Could Identify Chemical, Biological Threats;" Area News; May 15, 2002; 2 sheets.

Roland Piquepaille's Technology Trends; Mar. 24, 2004; "Will SensorNet Protect the U.S.?;" Jan. 4, 2004; 4 sheets.

Viridian; "Subject: Viridian Note 00349: SensorNet;" Nov. 2, 2002; 4 sheets.

Walli; "SensorNet Proposed As System To Protect Millions Nationwide;" Back to EurekAlert!; Public Release Date Mar. 12, 2004; 1 sheet.

Walli; SensorNet Proposed as System to Protect Millions Nationwide; Oak Ridge National Laboratory; Communications and Community Outreach; Mar. 12, 2004; 2 sheets.

"Sensor Technologies at ORNL;" PowerPoint Slides; undated; 2 sheets.

PCT Search Report and Written Opinion of the ISA for PCT/US2005/016385 dated Jul. 5, 2006.

Levesque; "Event Detection Module;" U.S. Appl. No. 11/126,560, filed May 11, 2005.

AU First Examination Report for AU2005326810 dated Sep. 2, 2008; 3 pages.

Popovich et al.; "The Framework for an Integrated Disease Surveillance System for Rapid Detection, Tracking, and Managing of Public Health Threats;" IEEE Engineering in Medicine and Biology; vol. 21, Issue 5; Sep. 1, 2002; ISSN: 0739-5175; pp. 48-55.

Tsui et al.; "Technical Description of RODS: A Real-time Public Health Surveillance System;" Journal of the American Medical Infommatics Assoc.; vol. 10, No. 5; Sep. 1, 2003; pp. 399-408.

PCT International Preliminary Report on Patentability and Written Opinion of the International Bureau dated Nov. 14, 2006 for PCT/US2005/016385 filed on May 11, 2005; 7 pages.

Levesque; "Event Detection Module;" U.S. Appl. No. 11/126,559 filed on May 11, 2005.

Image File Wrapper downloaded on Mar. 17, 2009 for U.S. Appl. No. 11/126,559 filed on May 11, 2005; Part 1 of 4; 198 pages.

Image File Wrapper downloaded on Mar. 17, 2009 for U.S. Appl. No. 11/126,559 filed on May 11, 2005; Part 2 of 4; 208 pages.

Image File Wrapper downloaded on Mar. 17, 2009 for U.S. Appl. No. 11/126,559 filed on May 11, 2005; Part 3 of 4; 176 pages.

Image File Wrapper downloaded on Mar. 17, 2009 for U.S. Appl. No. 11/126,559 filed on May 11, 2005; Part 4 of 4; 163 pages.

PCT Search Report and Written Opinion of the ISA for PCT/US2007/021700 dated Sep. 17, 2008.

* cited by examiner

EVENT ALERT SYSTEM AND METHOD

CROSS REFERENCE TO RELATED APPLICATIONS

This application claims the benefit of U.S. patent application Ser. No. 60/570,531 filed on May 12, 2004 under 35 U.S.C. §119(e), which application is hereby incorporated herein by reference in its entirety.

STATEMENT REGARDING FEDERALLY SPONSORED RESEARCH

Not Applicable.

FIELD OF THE INVENTION

This invention relates generally to systems and methods for detecting events occurring in the environment and, more particularly, to a system and method for detecting and communicating a hazardous event.

BACKGROUND OF THE INVENTION

Chemical agents, biological agents, radiological agents, and nuclear agents pose a threat to human and animal populations throughout the world. These agents can pose a potential threat resulting from intentional release by terrorists. Furthermore, dangerous explosions are known to be generated by terrorists. However, the above-identified agents and explosions can also pose a threat due to accidents, such as industrial accidents or natural disasters. For example, a large accidental chemical release in Bhopal, India in 1984 at a Union Carbide chemical plant killed as many as four thousand people. Industrial explosions are also known to occur.

Though sensors exist that are capable of detecting some or all the above-identified agents and explosions (referred to herein as events), the sensors are not in sufficiently widespread use to detect events in most geographic locations. Placing sensors at a sufficiently large number of locations to greatly increase a probability of event detection would require a great number of sensors and a large supporting infrastructure to mount the sensors, power the sensors, and receive signals from the sensors.

Furthermore, even if an event were detected, there is no ability to rapidly coordinate a response among many types of responders. Responders can include people from a variety of public and governmental organizations. For example, responders can include, but are not limited to, police, fire departments, civil defense, national guard, military, centers for disease control, disaster relief agencies, Red Cross, emergency medical technicians, hospitals, local government officials, state government officials, and federal government officials.

Proper coordination of the many types of responders requires a variety of types of information, some of which are not readily available upon first detection of an event. For example, types of information associated with an event include, but are not limited to, what was the type of event, where did the event occur, what was the geographic extent of the event, was the event correlated with other events, what is an acceptable response, what is the type of help needed, e.g., what agencies or departments, and what is the quantity of help needed.

Often, speed of response to an event is crucial in order to reduce harm to people, property, and the economy. However, the above-described types of information are often determined and/or acquired over a period of time by one or more people, limiting the speed of the response to the event.

SUMMARY OF THE INVENTION

In accordance with the present invention, a system for event alert includes a plurality of event modules adapted to detect an event and adapted to generate at least one event signal associated with the event. The system also includes a command center adapted to receive the at least one event signal and adapted to generate an intelligent response signal associated with the event. The intelligent response signal includes at least one of a response instruction associated with the event and related data associated with the event.

In accordance with another aspect of the present invention, a method of alerting associated with an event includes receiving at least one event signal associated with the event and generating an intelligent response signal associated with the event. The intelligent response signal includes at least one of a response instruction associated with the event and related data associated with the event.

In accordance with yet another aspect of the present invention, a system for event alert includes a plurality of event modules adapted to detect an event and adapted to generate at least one event signal associated with the event, wherein the event includes at least one of a nuclear event, a radiological event, a biological event, a chemical event, an explosive event, an explosion event, and a naturally occurring event. The system further includes a command center adapted to receive the at least one event signal and adapted to generate an intelligent response signal associated with the event. The intelligent response signal includes at least one of a response instruction associated with the event and data associated with the event. The command center includes at least one of: a validation processor adapted to receive the at least one event signal and adapted to receive a respective at least one validation signal associated with the event and adapted to compare the at least one event signal with the at least one respective validation signal, an event analysis processor adapted to determine a characteristic of the event, a data normalization processor adapted to normalize first information associated with a first event signal with second information associated with a second event signal so that the first and second information can be compared, and an event correlation processor adapted to correlate the first event signal with one or more other event signals. The system further includes at least one of: an event characteristics database, a population database, a geographic database, a weather database, an infrastructure capacity database, an emergency response capabilities database, a local point of contact database, a regional point of contact database, and a national point of contact database, having related data therein. The system still further includes a database fusion processor adapted to identify a relationship between the at least one event signal and the related data.

With these particular arrangements, the event alert system and method and the event detection module provide a comprehensive and robust wide area screen for detection of events.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Before describing the system and method for event detection, some introductory concepts and terminology are explained. As used herein, the term "event" is used to describe an event that occurs in the environment, for example, release of a biological agent (a "biological event"), release of a chemical agent (a "chemical event"), release of a radiological agent (a "radiological event"), release of a nuclear agent (a "nuclear event"), detection of an explosive agent (an "explosive event"), as well as an detection of an explosion (an "explosion event"), for example, a bomb, an industrial explosion, or a gun shot. Furthermore, as used herein, an "event" can also be naturally occurring, for example, an earthquake.

Figure 1:
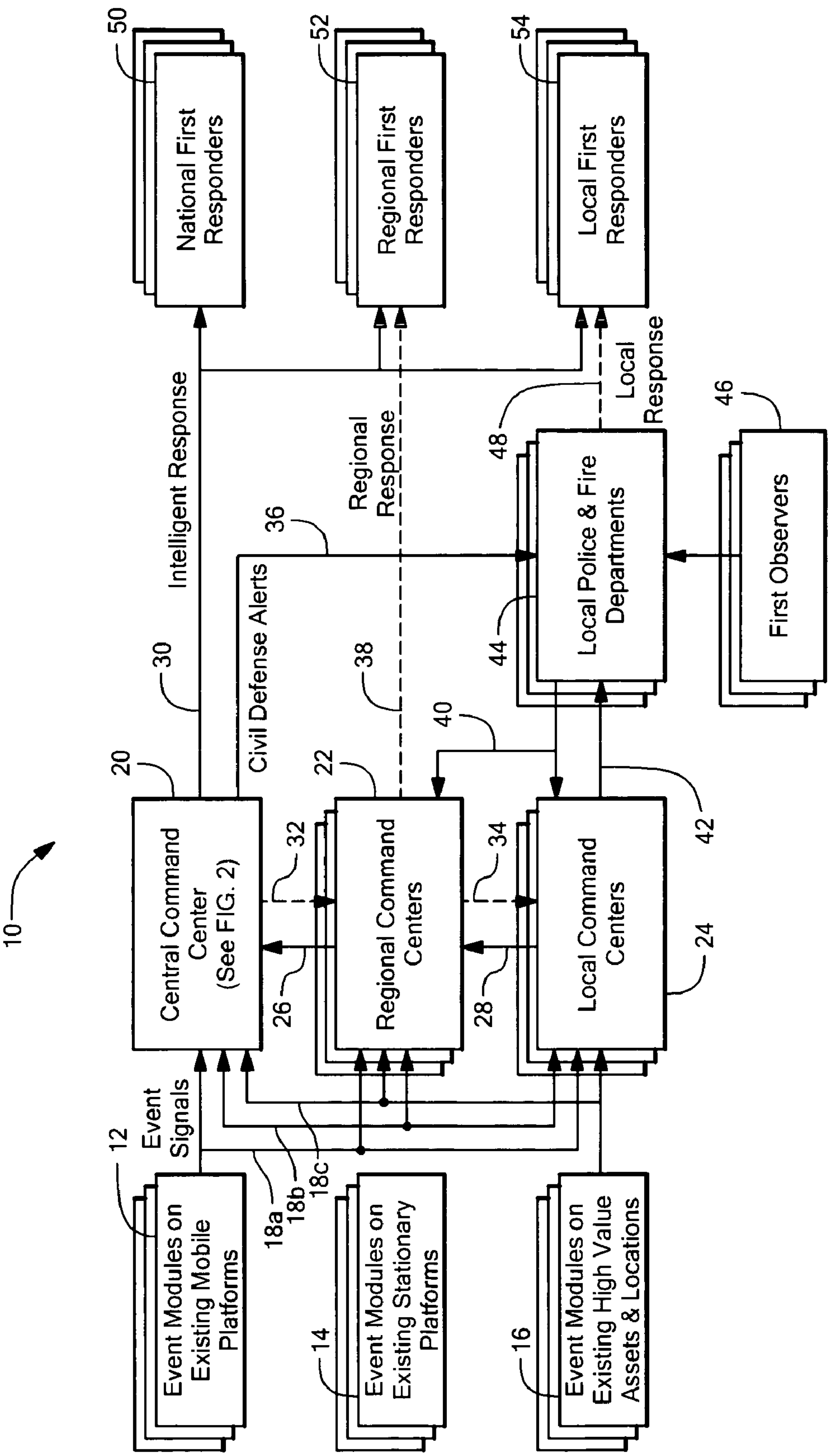
FIG. 1 is a block diagram of an exemplary event alert system.

Referring to FIG. 1, an exemplary event alert detection system 10 includes a plurality of event detection modules 12, 14, 16, or simply "event modules." Event modules 12 can be mounted on existing mobile platforms, event modules 14 can be mounted on existing stationary platforms, and event modules 16 can be mounted on or near high value assets and locations. The mobile platforms (not shown) can include, but are not limited to an ambulance, a postal delivery truck, a taxicab, a police car, a shipping and container port vehicle, a tugboat, a commercial aircraft, a ferryboat, a fire engine, a municipal vehicle, a mobile telephone, and a commercial delivery truck. The stationary platforms (not shown) can include, but are not limited to, a fire call box, a subway station, an elevator, an airport terminal, a postal box, a tractor trailer weigh station, a toll booth, a border crossing checkpoint, a hospital admission desk, a pay telephone, a railways freight facility, an immigration facility, a customs facility, an item of customs equipment, a mail facility, a commercial delivery facility, and a government building entrance. The high value assets and locations (not shown) can include, but are not limited to, a state capital building, a federal capital building, a state monument, a national monument, a parade, an Olympic activity, and any public gathering.

Figure 6:
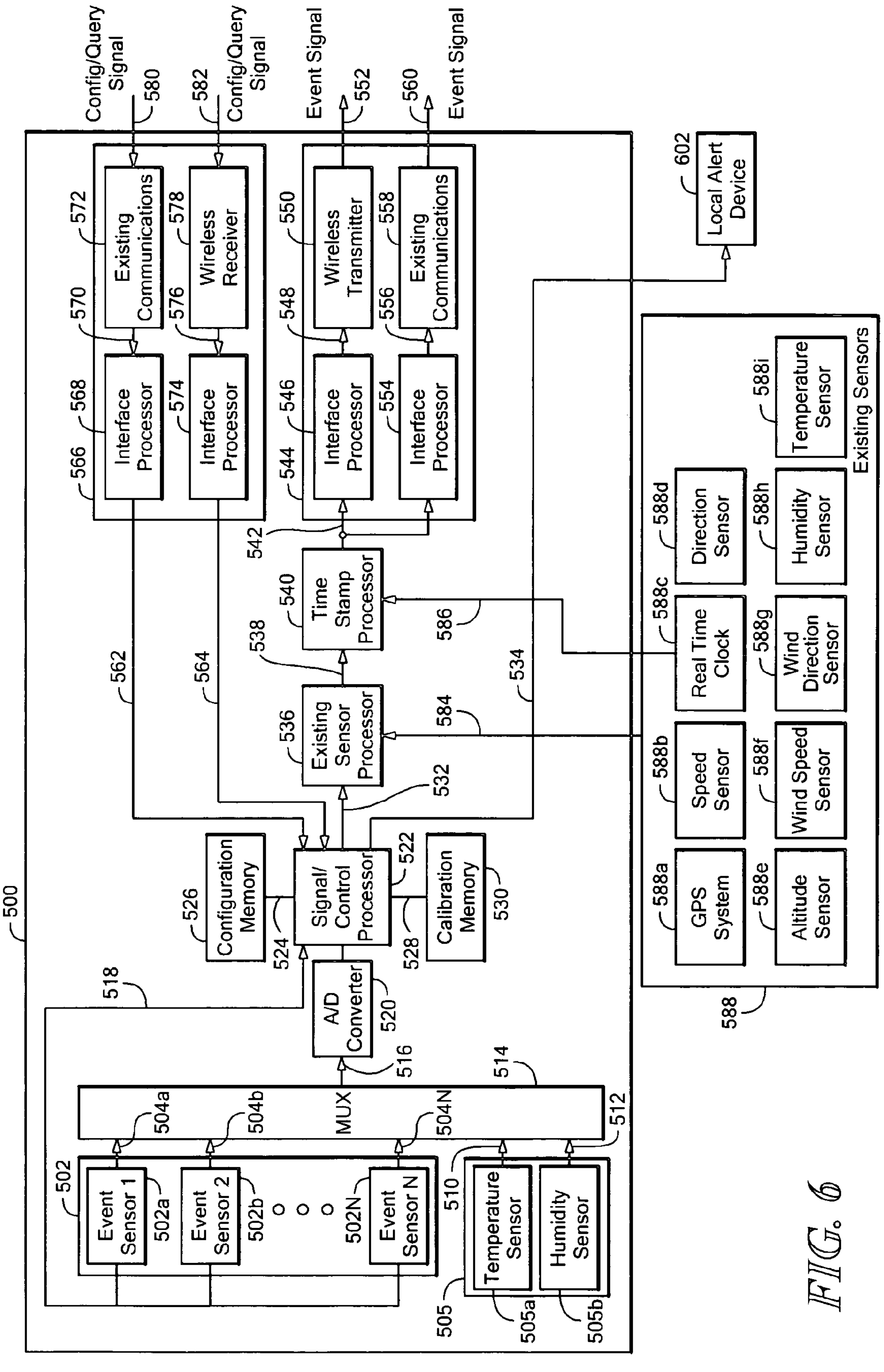
FIG. 6 is a block diagram of an exemplary event detection module.
Figure 7:
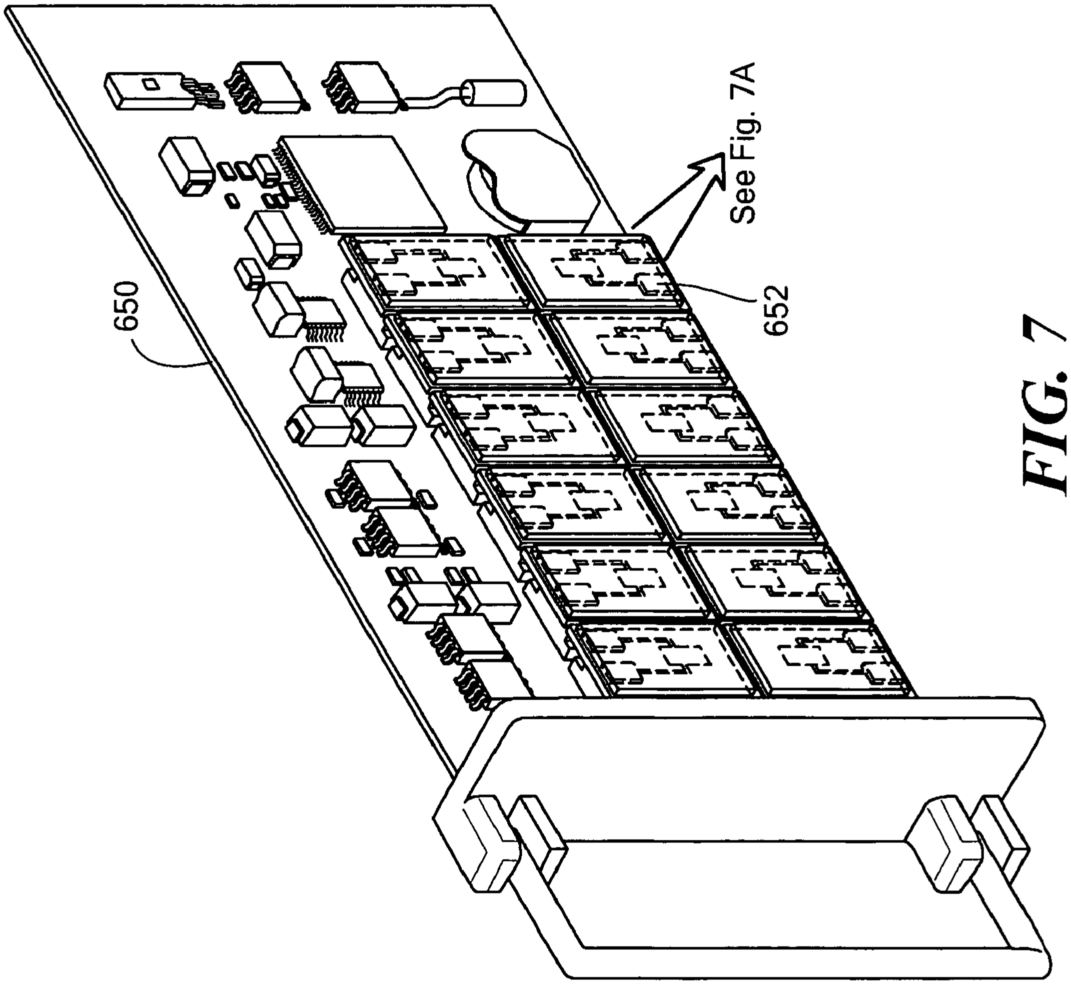
FIG. 7 is a solid model drawing of the event detection module of FIG. 6.
Figure 8:
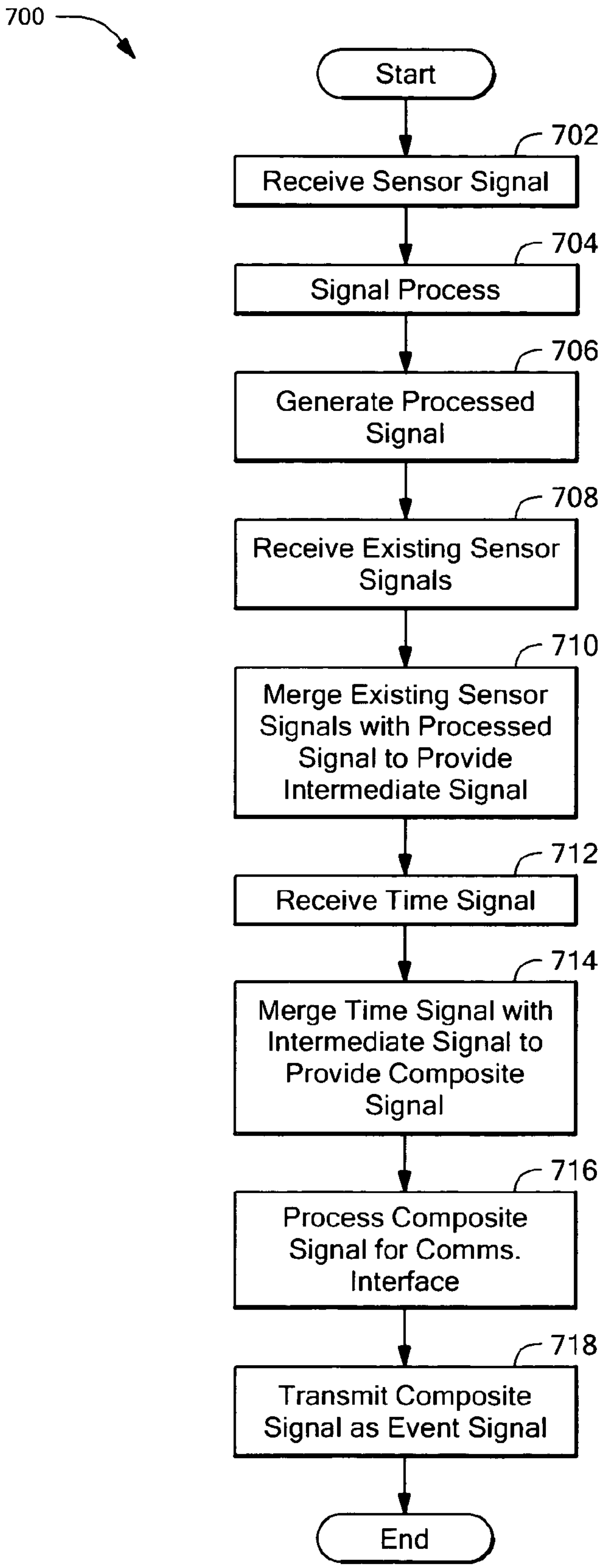
FIG. 8 is a flow chart of a process of event detection used by the event detection module of FIG. 6.

The event modules 12, 14, 16 are described more fully in conjunction with FIGS. 6-8. However, let is suffice here to say that each of the event modules 12, 14, 16 has one or more event sensors mounted thereon to detect one of more of a chemical event, a biological event, a radiological event, a nuclear event, an explosive event, an explosion event, and a naturally occurring event. Therefore, each event module 12, 14, 16 can detect one or a variety of hazardous events, depending upon a configuration of the event module. By providing a relatively large number of event modules 12, 14, 16, the event alert system 10 provides a high probability of relatively rapid detection of an event, enabling a relatively rapid response.

The event modules 12, 14, 16 generate one or more event signals 18*a*, 18*b*, 18*c*, respectively (collectively, event signals 18) upon detection of an event, which are received by a central command center 20, and optionally by one or more regional command centers 22 and/or one or more local command centers 24. The event signals 18 provide information about the event, including, but not limited to, a type of the event, and optionally, a time of the event, a location of the event, a speed of the asset (e.g., train) upon which the event was detected, an altitude of the asset (e.g., airplane) upon which the event was detected, a direction of travel of the asset upon which the event was detected, a wind speed proximate to the event module, a wind direction proximate to the event module, a temperature proximate to the event module, and a relative humidity proximate to the event module.

Figure 2:
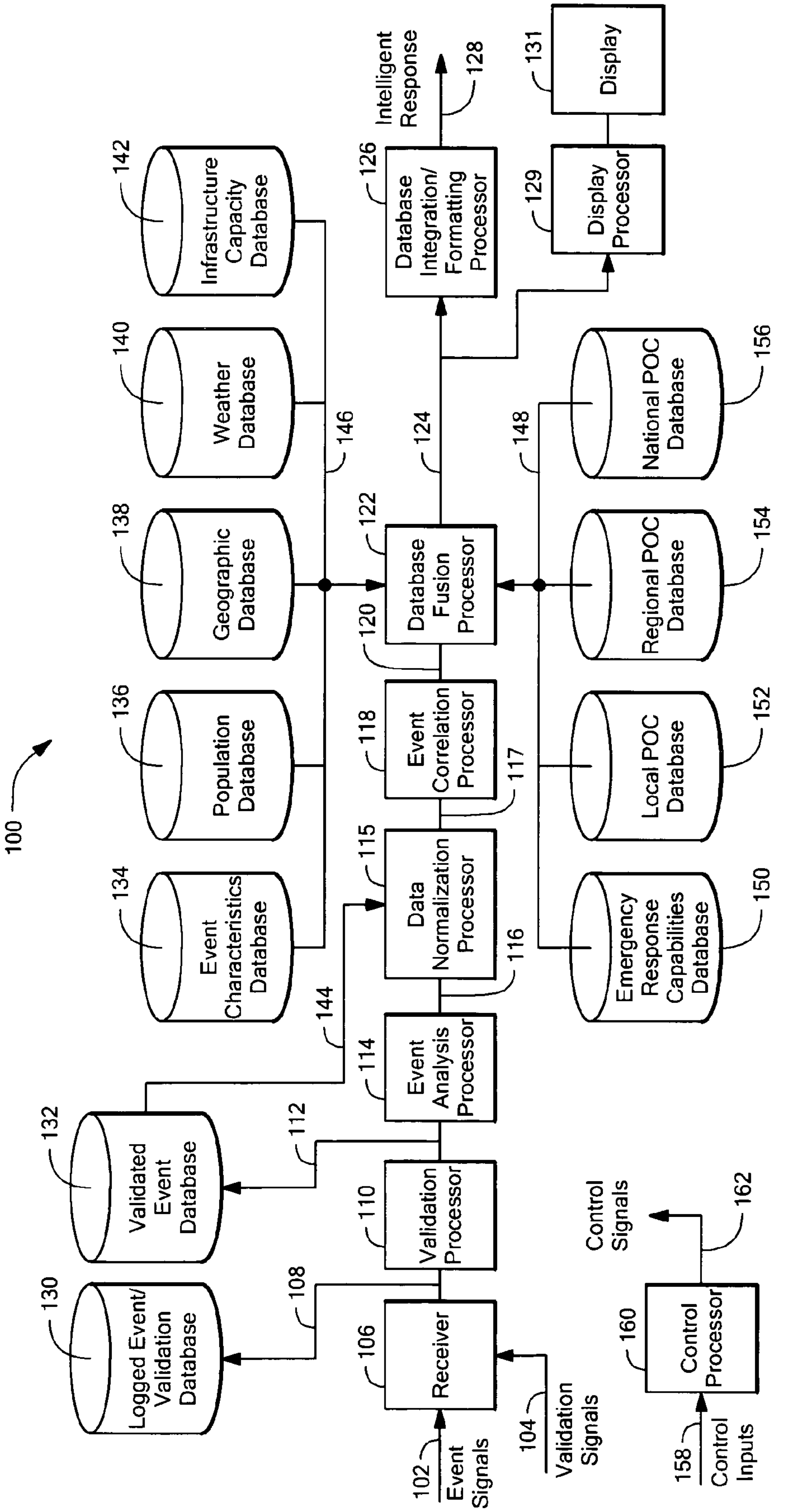
FIG. 2 is a block diagram of an exemplary central command center, which forms a part of the event alert system of FIG. 1.

The central command center 20 is described in greater detail in conjunction with FIG. 2. Let it suffice here to say that the central command center 20 analyzes the event signals 18 to determine if they are valid, and generates an intelligent response signal 30 that can include a variety of information. The variety of information included in the intelligent response signal 30 can include instructions, for example, how to respond, how not to respond, a quantity of help needed, a type of help needed, a local point of contact, a regional point of contact, a national point of contact, required protective gear, a safe standoff distance, and an evacuation plan. The variety of information included in the intelligent response signal 30 can also include "related data," for example, a type of the event, a time of the event, a location of the event, related circumstances to expect, properties of agent(s) associated with the event, correlation with other related events, a spread of the agent (e.g., plume modeling and prediction), related geographic information, related current and predicted weather information, local response capabilities, medical and trauma capabilities, and related infrastructure capacity information (e.g., bridges).

If the event signals 18 are deemed to be indicative of one or more valid events by the central command center 20, the intelligent response signal 30 is communicated to one or more of a national first responder 50, a regional first responder 52, and a local first responder 54. The intelligent response signal 30 may also be communicated to other recipients based on the nature of the incident and operational procedures of the responsible agency.

In some embodiments, one or more of the national first responders 50, the regional first responders 52, and the local first responders 54 can receive the intelligent response signal 30 with a wireless device (not shown), for example, a wireless telephone, a wireless programmable digital assistant (PDA), or a wireless email device, for example a Blackberry device. The wireless device can present a display of a variety of information associated with the intelligent response signal 30, including an instruction and/or "related data" associated with an event. Instructions and related data included in the intelligent response signal 30 are further described below in conjunction with FIG. 2.

In order to validate the event signals 18, the central command center 20 can receive a regional validation signal 26 from the one or more regional command centers 22, which in turn can receive a local validation signal 28 from the one or more local command centers 24.

One or more first observers 46 can provide information to police and fire departments 44, which in turn can provide a local event detection signal 40, or simply a local event signal

40, to the one or more local and/or regional command centers 24, 22, respectively, which can provide the local and/or regional event validation signals 28, 26 respectively, to the central command center 20. Upon receiving the local and/or regional event validation signals 28, 26, respectively, and having received the event signals 18, the central command center 20 can issue the intelligent response signal 30 as described above.

In addition to the intelligent response signal 30 issued by the central command center 20, the central command center 20 can also communicate civil defense alert signals 36 to one or more local police and fire departments 44. In response to the civil defense alert signals 36, civil defense alerts are provided from the central, regional, and/or local command centers 20, 22, 24, respectively, or the local police and fire departments 44 to the appropriate citizenry and/or the media as appropriate. The civil defense alerts can include but are not limited to Amber alerts and Be On LookOut (BOLO) alerts notifying the public of the threat or existence of danger (be it a terrorist act, industrial accident or natural disaster) along with the appropriate actions to take.

While the intelligent response signal 30 has been described above to be issued by the central command center 20, in an alternate arrangement, the central command center 20 can issue a secondary intelligent response signal 32 to the one or more regional command centers 22 in addition to or in place of the intelligent response signal 30. In this arrangement the one or more regional command centers 22 can also issue a secondary regional response signal 34 to the one or more local command centers 24. The secondary intelligent response signal 32 and the secondary intelligent response signal 34 can be the same as or similar to the intelligent response signal 30.

Upon receiving the secondary intelligent response signal 32, the one or more regional command centers 22 can validate the secondary intelligent response signal 32 and can generate a regional response signal 38, which is communicated to the regional first responders 52 in place of or in addition to the intelligent response signal 30. Similarly, upon receiving the secondary intelligent response signal 34, the one or more local command centers 24 can communicate a signal 42 to the local police and fire departments 44, which can communicate a local response signal 48 to the local first responders 54 in place of or in addition to the intelligent response signal 30. The regional response signal 38 and the local response signal 48 can be the same as or similar to the intelligent response signal 30.

With the above-described arrangements, it should be appreciated that the event signals 18 provided by the event modules 12, 14, 16 can be validated upward from the local command centers 24 to the regional command centers 22, to the central command center 20, resulting in validation and issuance of the intelligent response signal 30 by the central command center 20. Also, secondary intelligent response signals 32, 34 can flow downward from the central command center 20, to the regional command centers 22, to the local command centers 24, resulting in validation of the secondary intelligent response signals 32, 34 and issuance of the regional response signal 38 and the local response signal 48.

It should also be appreciated that the central command center 20 is relocatable, i.e., if the central command center 20 is disabled or brought off-line, any one of the regional command centers 22 or local command centers 24 would be able to be reconfigured, take the role and provide the same functions as the central command center 20.

Referring now to FIG. 2, an exemplary central command center 100 can be the same as or similar to the central command center 20 of FIG. 1. The central command center 100 can receive event signals 102, which are provided by event modules, with a receiver 106. The event signals 102 can be the same as or similar to the event signals 18 of FIG. 1 provided by the event modules 12, 14, 18 of FIG. 1. The central command center 100 can also receive validation signals 104 from regional command centers with the receiver 106. The validation signals 104 can be the same as or similar to the regional validation signals 26 of FIG. 1. Regional command centers 22 are shown and described in conjunction with FIG. 1.

In one particular embodiment, the receiver 106 is a wireless receiver adapted to receive wireless Internet signals. In another embodiment, the receiver is a wired receiver adapted to receive wired Internet signals. However, in still further embodiments, one of ordinary skill in the art will understand that there are numerous ways in which the central command center 100 can receive the event signals 102 and the validation signals 104. For example, in other embodiments, telephone communications and wireless communications in a variety of radio frequency bands can be used.

Event and validation signals 108 can be logged to a logged event/validation database 130. A validation processor 100 can compare the event signals 102, which may or may not be indicative of one or more events, with the validation signals 104, which also may or may not be indicative of one or more events. The validation processor 110 can determine whether an event has actually occurred, or instead, whether a false alarm has been received in the event signals 102. If the event is validated, a validated event signal 112 is stored to a validated event database 132.

The validated event signal 112 can be analyzed by an event analysis processor 114 to determine characteristics of the event, e.g., the type of event, the time of the event, and the place of the event. Because the validated event signal 112 can contain more than one validated event signal from among the event signals 102, the event analysis processor 114 can determine the number of actual events, and the locations and the times of the actual events and can provide an analyzed event signal 116.

A data normalization processor 115 can normalize the analyzed event signal 116 and other event signals 144 contained in the validated event signal database 132 so that they can be compared.

An event correlation processor 118 can correlate event signals within the analyzed event signal 116 with other recently occurring event signals 144 stored in the validated event database 132, providing a correlated event signal 120. For example, the analyzed event signal 116 can indicate a single release of anthrax in New York at 1:00 PM from among more than one event signal 102 provided by more than one event module (e.g., event modules 12, 14, 16, FIG. 1). The analyzed event signal 116, which indicates the anthrax release, can be correlated with other validated events 144, for example a nearby anthrax release at 12:30, to provide a geographical extent of the anthrax release.

Also, the event signals 102 from event modules in one geographic region stored in the validated event database 132 can be correlated with event signals 102 from event modules in another geographic region to indicate related events. Therefore, the correlation provided by the event correlation processor 118 can be one or more of a temporal correlation, for which events at or near the same time are correlated, a spatial correlation, for which events at or near the same physical location are correlated, and a semantic correlation, for which different detected aspects (event signals) associated with an event are correlated.

The correlated event signal 120 is processed by a database fusion processor 122. The database fusion processor 122 calls upon a variety of databases for "related data," which is related to the detected event. The databases to which the database fusion processor 122 can have access include, but are not limited to, an event characteristics database 134, a population database 136, a geographic database 138, a weather database 140, an infrastructure capacity database 142, an emergency response capabilities database 150, a local point of contact (POC) database 152, a regional POC database 154, and a national POC database 156. The databases are further described below. Each of the databases 134-142, 150-156, can provide additional information ("related data") to the database fusion processor 122, resulting in a combined response signal 124 having the additional information.

The combined response signal 124 is processed by a database integration/formatting processor 126 to generate an intelligent response signal 128, which can be the same as or similar to the intelligent response signal 30 of FIG. 1.

The event characteristics database 134 can provide data associated with the type of event. For example, if an anthrax event has been identified, the event characteristics database 134 can provide a variety of information, including but not limited to, antibiotic information, protective gear information, standoff range information, and incubation time information.

The population database 136 can provide population information associated with the location of the event. The population database 136 can provide a variety of information, including but not limited to, a total population in the affected area, a population density, a daily population variation due to commuters and the like, a schedule of local activities that affect the local population, and a population variation due to the local activities.

The geographic database 138 can provide geographic data associated with the location of the event. The geographic database 138 can provide a variety of information, including but not limited to, information about wetlands, mountain ranges, etc., likely to affect spread of a hazardous agent.

The weather database 140 can provide weather information associated with the location of the event. The weather database 140 can provide a variety of information, including but not limited to, information about rain and/or winds that can affect the spread of a nuclear material. The weather information can be combined with environmental information provided directly by the event sensors as will be described in conjunction with FIG. 6.

The infrastructure capacity database 142 can provide information about the roads and public transportation pertaining to the place of the event. The infrastructure capacity database 142 can provide a variety of information, including but not limited to, information about evacuation routes, a volume of automobiles that can be accommodated on the evacuation routes, and an evacuation plan.

The emergency response capabilities database 150 can provide information about the emergency response facilities near the place of the event. The emergency response capabilities database 150 can provide a variety of information, including but not limited to, a listing of hospitals and ambulance services near the location of the event.

The local POC, regional POC, and national POC databases 152, 154, 156, respectively, can provide names of individuals and/or agencies that are pre-established to be points of contact for particular types of events. For example, the Center for Disease Control can be identified from the national POC database 156 in the case of an event corresponding to release of an infectious agent.

Having the access to the various databases 134-142, 150-156, the intelligent response signal 128 can include a comprehensive set of related data pertaining to the detected event, allowing a rapid and accurate response. The intelligent response signal 128 can also include specific response instructions directed at a local POC, a regional POC, and a national POC.

In some embodiments, the central command center 100 can include a display processor 129 and a display 131, adapted to provide a display, for example a two-dimensional or three-dimensional display. In some embodiments, the presented display is a geographical information system (GIS) type display, showing the location of the event and surrounding locations and having embedded information layers.

In some embodiments, the central command center 100 can include a control processor 160 adapted to receive control inputs 158 and to provide control signal 162. The control inputs 158 can be provided, for example, by a human operator or by another system, for example, a regional command center. The control processor 160 can send the control signals 162 to other elements of the central command center 100, for example, to any of the processors 110, 114, 115, 118, 122, 126, and 129. The control processor 160 can include controls that allow the human operator to enter commands to the control processor 160 that can affect operation of the central command center 100. For example, in some embodiments, the control processor 160 allows the human operator to review and/or modify data provided by the database fusion processor 122 before it is entered into the combined response signal 124. The control processor 160 can allow the human operator access to any of the data 108, 112, 116, 144, 117, 120, 124, 128, allowing the human operator to review and modify the data before it is combined into the intelligent response signal 128.

While the central command center 100 has been described, regional and local command centers, for example the regional and local command center 22, 24, respectively of FIG. 1, can be the same as or similar to the central command center 100. However, in other embodiments, the regional and/or local command centers 22, 24, respectively, can have reduced capability. For example, in some embodiments, the regional and/or local command centers 22, 24, respectively omit the databases 134-142, 150-156.

While the central command center 100 is shown to include a variety of processors and databases, in other embodiments, one or more of the databases and one or more of the processors can be omitted.

Figure 3:
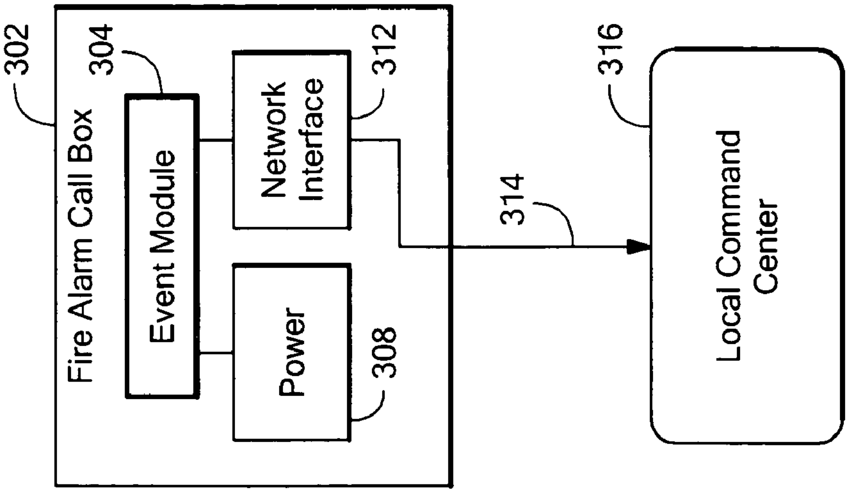
FIG. 3 is a block diagram of the an event detection module used in an existing fixed asset, which is a fire alarm call box.

Referring now to FIG. 3, an event module 304 is mounted within an existing fixed fire alarm call box 302. The event module 304 can be the same as or similar to the stationary event modules 14 of FIG. 1. As will be described in greater detail in conjunction with FIG. 6, the event module 304 can couple to existing network interface electronics 312 that allow the event module 304 to communicate an event signal 314 upon detection of an event via an existing network interface, which is part of the existing fire alarm call box 302, to a regional command center (not shown) or to a local command center 316. The local command center 316 can be the same as or similar to the one of the local command centers 24 of FIG. 1, and the event signal 314 can be the same as or similar to the event signal 18*b* of FIG. 1. The event module 304 can receive power from an existing power source 308 within the fire alarm call box 302.

Figure 4:
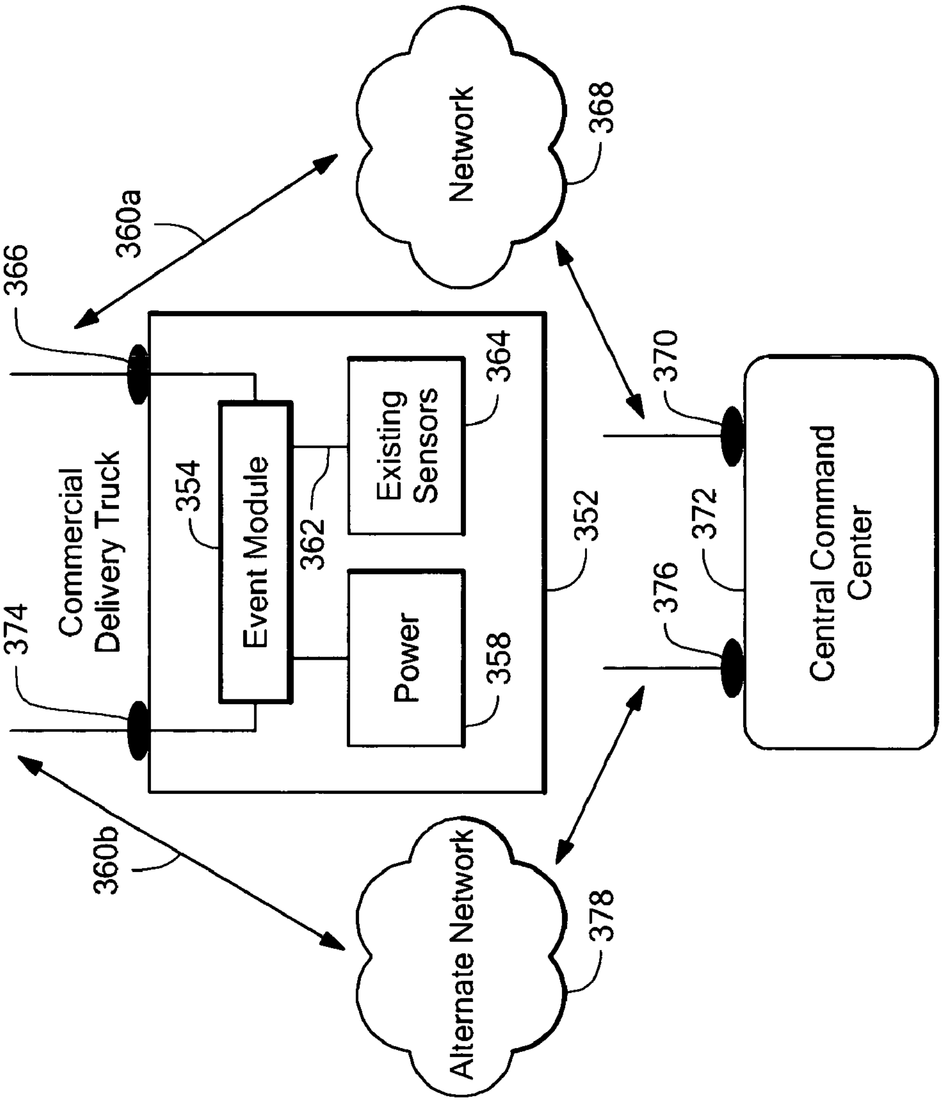
FIG. 4 is a block diagram of another event detection module used in an existing mobile asset, which is a commercial delivery truck.

Referring now to FIG. 4, an event module 354 is mounted within an existing commercial delivery truck 352. The event module 354 can be the same as or similar to the mobile event modules 12 of FIG. 1. The event module 354, upon detecting an event, can communicate an event signal 360*a* via a wireless transmitter/receiver 366 to a wireless transmitter/receiver 370 associated with a central command center 372 via a network 368, for example, the Internet. The central command center 372 can be the same as or similar to the central command center 20 of FIG. 1 and/or the central command center 100 of FIG. 2. The commercial delivery truck 352 can also have a secondary, backup, transmitter/receiver 374 that can communicate an event signal 360*b* to another wireless transmitter/receiver 376 associated with the central command center 372 via an alternate network 378, for example, the wireless telephone network.

The commercial delivery truck 352 can provide existing sensor signals 362 from one or more existing sensors 364 to the event module 354. For example, the commercial delivery truck can provide a global positioning system (GPS) signal to identify a location of the commercial delivery truck 352. For another example, the commercial delivery truck 352 can also supply a speed signal associated with an existing speedometer (not shown). The event module 354 can receive power from an existing power source 358 within the commercial delivery truck 352.

Figure 5:
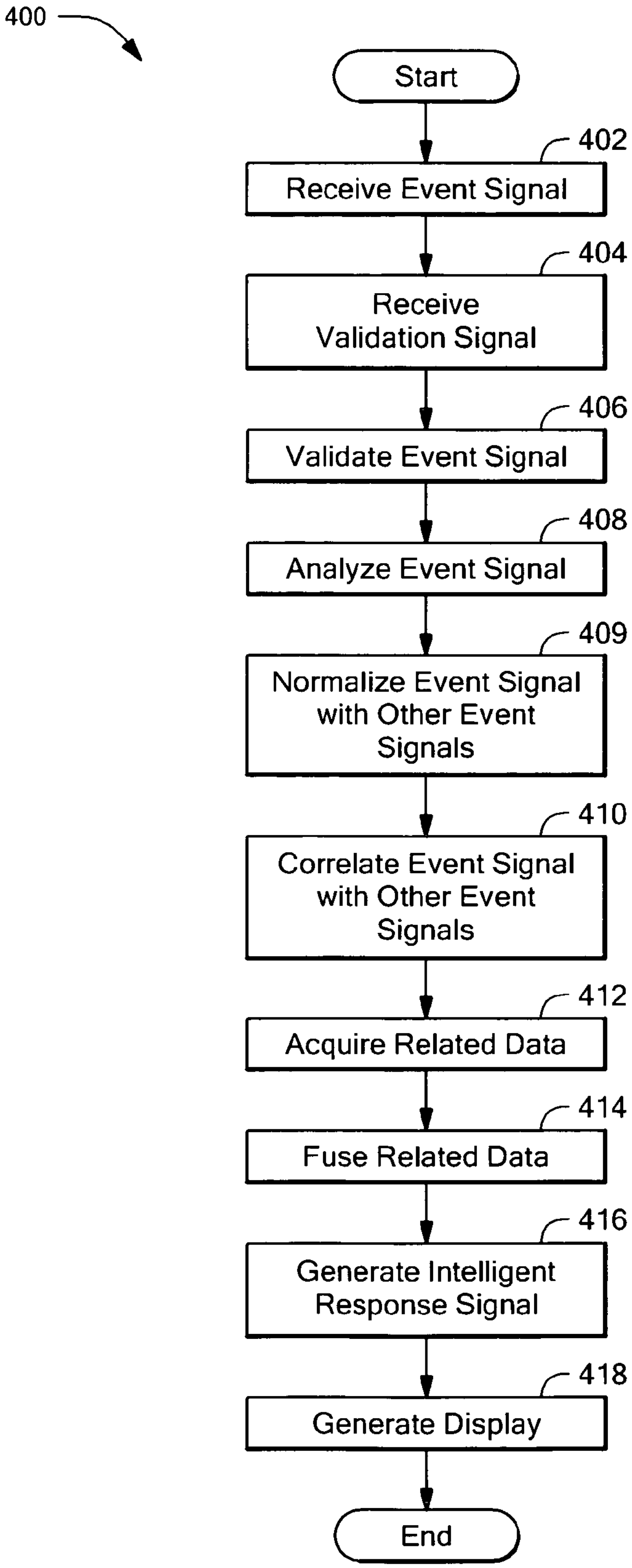
FIG. 5 is a flow chart of a process for event detection and alert used by the central command center of FIG. 2.

It should be appreciated that FIG. 5 shows a flowchart corresponding to the below-contemplated technique, which would be implemented in central command center 100 (FIG. 2). The rectangular elements (typified by element 402 in FIG. 5), herein denoted "processing blocks," represent computer software instructions or groups of instructions. Diamond shaped elements (not shown), herein denoted "decision blocks," represent computer software instructions, or groups of instructions, which affect the execution of the computer software instructions, represented by the processing blocks.

Alternatively, the processing and decision blocks represent steps performed by functionally equivalent circuits such as a digital signal processor circuit, a microprocessor, or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables, control signals, and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated, the blocks described below are unordered meaning that, when possible, the steps can be performed in any convenient or desirable order.

Referring now to FIG. 5, a process 400 associated with a central command center, for example, the central command center 100 of FIG. 2, begins at block 402, where an event signal is received, for example, the event signal 102 of FIG. 2.

At block 404, a validation signal is received, for example, the validation signal 104 of FIG. 1. The events signal received at block 402 is validated at step 406 using the validation signal received at block 404, for example, using the validation processor 110 of FIG. 2.

At block 408, the resulting validated event is analyzed at block 408, for example, with the event analysis processor 114 of FIG. 2.

At block 409, the validated event signal is first normalized and then at block 410 it is correlated with other validated event signals, for example, with the event correlation processor 118 of FIG. 2.

At block 412, related data is acquired from a variety of databases, for example, from the databases 134-142, 150-156 of FIG. 2. The related data is fused at block 414 with the validated event signal of block 406, for, example, with the database fusion processor 122 of FIG. 2.

At block 416, an intelligent response signal is generated, for example with the database integration/formatting processor 126 of FIG. 2, which generates the intelligent response signal 128 of FIG. 2.

A display associated with the event validated at block 406 and having related data as acquired at block 412 is generated at block 418. The display can be of a type, for example, described above in conjunction with the display 131 of FIG. 2.

Referring now to FIG. 6, an event module 500 can be the same as or similar to the event modules 12, 14, 16 of FIG. 1. The event module 500 includes one or more event sensors 502*a*-502N, collectively event sensors 502, which generate one or more respective sensor signals 504*a*-504N. The event sensors 502*a*-502N are selected from among a variety of event sensors, including but not limited to, a biological agent sensor, a chemical agent sensor, a radiological agent sensor, a nuclear agent sensor, an explosive sensor, a vibration sensor, a seismic sensor, and an acoustic sensor, wherein the acoustic sensor and the vibration sensor can be tailored to identify explosions and/or gunshots. As described above, the event sensors are adapted to identify an event, for example, a harmful agent and/or an explosion and/or a naturally occurring event, for example, an earthquake.

The event module 500 can also include one or more environmental sensors 505, for example, a temperature sensor 505*a* adapted to generate a temperature signal 510 and a humidity sensor 505*b* adapted to generate a humidity signal 512. The one or more sensor signals 504*a*-504N, the temperature signal 510, and the humidity signal 512 are coupled to a multiplexer 514, which presents the above signals one or more at a time as a mux signal 516 to an analog-to-digital (A/D) converter 520, digital samples from which are presented to a signal/control processor 522. The signal/control processor 522 is adapted to process each of the sensor signals 504*a*-504N in accordance with a type of event sensor, which generated the particular sensor signal.

An identification signal 518 can be provided to identify to the signal/control processor 522, what type of event sensor is at each physical location so that the signal/control processor 522 can process the sensors signals 504*a*-504N according to the type of event sensor. The identification signal 518 can also include information about the date of installation or manufacture of each event sensor, allowing a replacement (maintenance) date to be identified and communicated by the signal/control processor 522.

Configuration information, including, but not limited to, a type of event sensor at each physical location and the date of installation or manufacture of each event sensor can be stored in a configuration memory 526. The configuration memory 526 can also store constant values used in the processing performed by the signal/control processor 522, and can also store processing algorithms used in the processing. A calibration memory 530 can provide calibration values as a calibration signal 528 to the signal/control processor 522, which can also be used during the processing. The calibration values can be generated, for example, at power up of the event module 500. In an alternate arrangement, the calibration values can be generated during manufacture of the event module 500. In still another alternate arrangement, the calibration values can be downloaded to the event module 500. The calibration values 528 can include calibration values associated with particular ones of the event sensors 502 and with particular ones of the environmental sensors 505.

The signal/control processor 522 generates a processed signal 532, which can indicate or not indicate detection of an event by one or more of the event sensors 504*a*-504N, and which can indicate event sensors that have failed or that need scheduled replacement. The processed signal 532 can also include information from one or more of the environmental sensors 505.

An existing sensor processor 536 can receive one or more existing sensor signals 584 associated with one or more existing sensors 588, and can combine the information from the one or more existing sensors 588 with the processed signal 532 to generate an intermediate signal 538. The existing sensors can include, but are not limited to, a global positioning system (GPS) 588*a*, a speed sensor 588*b*, a real time clock 588*c*, a direction sensor 588*d*, an altitude sensor 588*e*, a wind speed sensor 588*f*, a wind direction sensor 588*g*, a humidity sensor 588*h*, and a temperature sensor 588*i*.

The real-time clock 598 can provide a real-time clock signal 586 to a time stamp processor 540. The time stamp processor 540 can generate a time stamp signal and merge the time stamp signal with the intermediate signal 538 to provide a composite signal 542.

The composite signal 542 is sent to one or both of an interface processor 546 and an interface processor 554. Each of the interface processors 546, 554 format the composite signal 542 for transmission as an event signal 552, 560, respectively, by a wireless transmitter 550 and/or by existing communications 558 associated with an existing asset, for example a fire alarm call box as shown in FIG. 3. The event signals 552, 560 can be the same as or similar to the event signals 18 of FIG. 1.

With this arrangement, transmit electronics 544 can be adapted to communicate the event signal 552, 560 either via a dedicated wireless transmitter 550 or via existing communications 558, which can either be wireless or wired. Furthermore, when using the existing communications 558, the interface processor 554 can be adapted to the particular existing communications 558. In one particular embodiment, for example, the signal 556 is an RS-232 signal.

In one particular embodiment, the interface processor 554 is modular and adapted to be plugged into the event module 500. With this particular arrangement, the interface electronics 554 can be selected and changed in accordance with the type of existing communications 558.

The signal/control processor 522 can also provide a local alert signal 534 received by a local alert device 602, which can be, for example, an audible alert device or a visual alert device. When the event module 500 is mounted to an existing fixed asset, for example, a fire alarm call box 302 as shown in FIG. 3, the local alert device 602 can indicate a detection of an event to those in proximity to the fire alarm call box 302.

The event module 500 can also have receive electronics 566, which, like the transmit electronics 544, can include existing communications 572, which can either be wireless or wired. The existing communications 572 can receive a configuration/query signal 580, and via an interface processor 568, can either query the event module 500 or can update configuration information in the configuration memory 526, for example, constant values and/or executable processing code. The event module 500 can also receive a configuration/query signal 582, which can be received by a dedicated wireless receiver 578. Via interface electronics 574, the configuration/query signal 582 can perform the same functions as the configuration/query signal 580 described above.

While the transmitter electronics 544 and the receiver electronics 566 are each shown to include both existing communications 558, 572 respectively and dedicated wireless transmitter and receiver 550, 578, respectively, it will be appreciated that this arrangement is redundant and that only one of the existing communications 558, 572 and the dedicated wireless electronics 550, 578 is needed. Also, in some embodiments, the receiver electronics 566 is not needed. Furthermore, in other embodiments, one or both of the wireless transmitter 550 and wireless receiver 578 are instead a wired transmitter and wired receiver. In yet further embodiments, one or both of the wireless transmitters 550 and the wireless receiver 578 are provided by a wireless telephone, for example, a cellular telephone. In some of these embodiments, the wireless telephone can be within the event module 500. In others of these embodiments, the wireless telephone can be separate from the event module 500 and coupled to the event module 500, for example, with a wire.

While the existing sensors 588 are described to include sensor associated with environmental characteristics, it should be appreciated that, in other embodiments, the existing sensors 588 can include one or more event sensors, including but not limited to, a biological agent sensor, a chemical agent sensor, a radiological agent sensor, a nuclear agent sensor, an explosive sensor, a vibration sensor, a seismic sensor, and an acoustic sensor.

Furthermore, while only the temperature sensor 505*a* and humidity sensor 505*b* are shown in conjunction with the event module 500, in other embodiments, any of the existing sensors 588 can be included in the event module 500. Also, while two environmental sensors 505*a*, 505*b* are shown in conjunction with the event module 500, the event module 500 can include more than two or fewer than two environmental sensors. While the real time clock 588*c* is shown to be external to the event module 500, in other embodiments, the real time clock 588*c* can be within the event module 500. While the existing sensors 588 are shown to include nine existing sensors 588*a*-588*i*, in other embodiments more than nine or fewer than nine existing sensors can be included. While the local alert device 602 is shown to be external to the event module 500, in other embodiments, the local alert device 602 is included on the event module 500.

With the event module 500 having multiple event sensors 504*a*-504N, the event module 500 is able to detect a variety of hazardous events. Having the ability to be mounted on existing assets, including existing fixed assets and existing mobile assets, event modules can be used in a wide variety of locations enabling rapid detection and localization of the hazardous events.

While the event module 500 is shown to include the existing sensor processor 536 and the time stamp processor 540, in other embodiments, one or both of these processors is omitted.

Referring now to FIG. 7, an event module 650 includes one or more event sensors. Here, an event sensor 652 is representative of others of the event sensors. The event sensors, for example, the event sensor 652, can be the same as or similar to the event sensors 502 of FIG. 6, and also to the environmental sensors 505 of FIG. 6. The event sensors, for example the event sensor 652, are modular and adapted to be plugged into the event module 650. With this arrangement, any of the above-described types of event sensor (and/or environmental sensor) can be plugged into any of the twelve physical locations on the event module 650. While twelve event sensors are shown, in other embodiments, the event module 650 can have more than twelve or fewer than twelve event sensors.

In one embodiment, the event module 650 is designed to require less than one hundred fifty milliwatts of power to allow use in some existing self-contained applications such as the fire alarm call box 302 of FIG. 3. In other embodiments, however, the event module 650 is designed to require less than fifty milliwatts of power, allowing it to be powered by batteries for a substantial period of time. In still other embodiments, for example, embodiments for which power is not a constraint, the event module 650 can be designed to require more than one hundred fifty milliwatts of power.

Figure 7A:
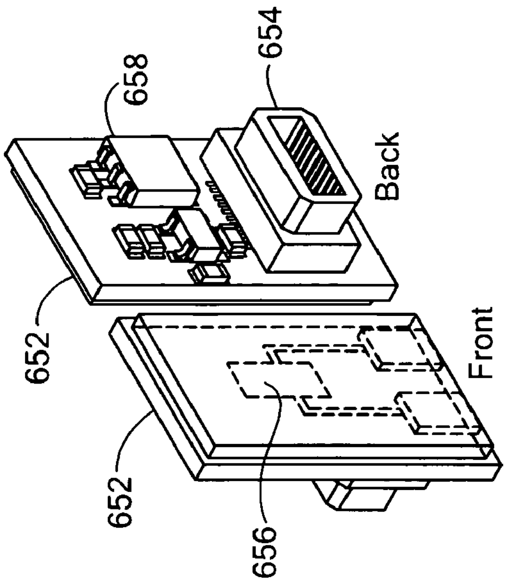
FIG. 7A is a solid model drawing showing front and back views of an event sensor used in the event detection module of FIG. 7.

Referring now to FIG. 7A, the event sensor 652 has a connector 654 adapted to plug into the event module 650 of FIG. 7. The event sensor 652 includes a sensor element 656 and electronics 658, which can, for example, amplify a signal from the sensor element 656. The electronics 658 can also include a memory, for example a serial memory, to hold information about the event sensor 652, for example, a type of event sensor, a date of manufacture, an installation date, and/or a maintenance date associated with the event sensor 652. The serial memory can be associated with the identification signal 518 of FIG. 6.

In some embodiments, the event sensors, for example, the event sensor 652, is field replaceable by unplugging one event sensor and installing a replacement event sensor. In some embodiments, the replacement event sensor can be a different type of event sensor. For example, if the event sensor 652 is a biological agent sensor, in some embodiments, the event sensor 652 can be replaced with a chemical agent sensor. In these embodiments, the signal/control processor 522 FIG. 6 is adapted to identify the type of event sensor at each physical location (for example, by way of the identification signal 518) and to process signals from the events sensors accordingly. Therefore, in some embodiments, the event module 500 is reconfigurable.

In some embodiments, one or more of the event sensors (e.g., 652) are coupled to the event module 650 with wires, for example, with a ribbon cable. This arrangement may be particularly advantageous for event sensors that have increased sensitivity when mounted outside of a metal box in which the event module 650 might reside. It will be appreciated that event sensors coupled to the event module with wires can retain all of the features and functionality described above, for example, the ability to be recognized by the signal/control processor 522 of FIG. 6. Therefore, the event sensors are included in a common circuit board with other elements of the event module 500, whether they plug into the event module 500 directly, or via wires.

Referring now to FIG. 8, a process 700 is used by an event module, for example, the event module 500 of FIG. 6. The process 700 begins at block 702 where a sensor signal is received, for example, a sensor signal 504*a*-540N, 510, 512 from one or more of the event sensors 502 and/or the environmental sensors 505 of FIG. 6. The sensor signal is processed at block 704 to identify a hazardous event and to generate a processed signal at block 706, for example, by the signal/control processor 522 of FIG. 6 to generate the processed signal 532 (FIG. 6).

At block 708 existing sensor signals are received, for example, with the existing sensor processor 536 of FIG. 6, and at block 710 the existing sensor signals are merged with the processed signal to generate an intermediate signal, for example the intermediate signal 538 of FIG. 6.

At block 712, a time signal is received, for example with the time stamp processor 540 of FIG. 6. At block 714, the time signal is merged with the intermediate signal to generate a composite signal, for example, the composite signal 542 of FIG. 6.

At block 716, the composite signal is processed for communication, for example, by the interface processors 546, 554 of FIG. 6, and at block 718, the composite signal is transmitted as an event signal, for example by the wireless transmitter 550 and/or by the existing communications 558 of FIG. 6 as event signals 552, 560, respectively.

All references cited herein are hereby incorporated herein by reference in their entirety.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A system for event alert, comprising:

a plurality of event modules configured to detect an event and configured to generate at least one event signal associated with the event; and a command center configured to receive the at least one event signal and configured to generate an intelligent response signal associated with the event, wherein the intelligent response signal includes a response instruction associated with the event and related data associated with the event, wherein the command center is also configured to communicate the intelligent response signal to at least one of a national first responder, a regional first responder, or a local first responder selected from among a plurality of local responders, each one of the plurality of local responders associated with a different respective location at which the event may have been detected, and wherein the response instruction comprises an instruction indicative of how one or more people should respond or how one or more people should not respond in order to mitigate harm that could be caused by the event.

2. The system of claim 1, wherein the response instruction associated with the event or the related data associated with the event includes a location of the event, a type of the event detected from among a plurality of potential types of events, and one or more actions associated with the event to be taken by one or more people, and wherein the related data associated with the event further includes at least one of a correlation to another event, a type of help, a quantity of help, a national point of contact, a regional point of contact, or a local point of contact selected from among a plurality of local points of contact, each one of the plurality of local points of contact associated with a different respective location at which the event may have been detected.

3. The system of claim 1, wherein the event includes at least one of a nuclear event, a radiological event, a biological event, a chemical event, an explosion event, or a naturally occurring event.

4. The system of claim 1, wherein the command center includes a validation processor configured to receive the at least one event signal and configured to receive at least one respective validation signal associated with the event from a remote location and configured to compare the at least one event signal with the at least one respective validation signal in order to generate a validated at least one event signal, wherein the intelligent response signal is generated in response to the validated at least one event signal.

5. The system of claim 4, wherein the command center comprises a central command center configured to also generate a secondary intelligent response signal, wherein the system further comprises at least one of:

a regional command center coupled to receive the secondary intelligent response signal from the central command center, or a local command center coupled to receive the secondary intelligent response signal from at least one of the central command center or the regional command center, wherein the at least one of the regional command center or the local command center is configured to provide the validation signal in response to the secondary intelligent response signal.

6. The system of claim 1, wherein the command center includes an event analysis processor configured to determine a characteristic of the event.

7. The system of claim 1, wherein the command center includes a data normalization processor configured to normalize first information associated with a first event signal with second information associated with a second event signal so that the first and second information can be compared.

8. The system of claim 1, wherein the command center includes an event correlation processor configured to correlate a first event signal with one or more other event signals.

9. The system of claim 1, wherein the command center includes:

a database fusion processor; and at least one database having the related data therein, the at least one database comprising at least one of: an infrastructure capacity database, an emergency response capabilities database, a local point of contact database having a plurality of local points of contact associated with a plurality of different respective locations at which the event may have been detected, a regional point of contact database, or a national point of contact database, wherein the database fusion processor is configured to identify a relationship between the at least one event signal and the related data.

10. The system of claim 1, wherein at least one of the at least one event signal is a wireless event signal and the command center is configured to receive the wireless event signal.

11. The system of claim 1, wherein the plurality of event modules includes at least one mobile event module operational within a moving vehicle.

12. The system of claim 1, wherein at least one of the plurality of event modules is configured to detect more than one different one of a nuclear event, a radiological event, a biological event, a chemical event, an explosion event, and an explosive event.

13. The system of claim 5, wherein the central command center is relocatable such that at least one of the regional command center or the local command center can perform functions of the central command center.

14. The system of claim 5, wherein at least one of the regional command center or the local command center is configured to generate a response signal for communication to at least one of the regional first responder or the local first responder, respectively.

15. A method of alerting associated with an event, comprising: receiving at least one event signal associated with the event;

generating an intelligent response signal associated with the event, wherein the intelligent response signal includes a response instruction associated with the event and related data associated with the event and communicating the intelligent response signal to at least one of a national first responder, a regional first responder, or a local first responder selected from among a plurality of local responders, each one of the plurality of local responders associated with a different respective location at which the event may have been detected, wherein the response instruction comprises an instruction indicative of how one or more people should respond or how one or more people should not respond in order to mitigate harm that could be caused by the event.

16. The method of claim 15, wherein the response instruction associated with the event or the related data associated with the event includes a location of the event, a type of event detected from among a plurality of potential types of events, and one or more action associated with the event to be taken by one or more people wherein the related data associated with the event also includes at least one of a correlation to another event, a type of needed help, a quantity of needed help, a national point of contact, a regional point of contact, or a local point of contact selected from among a plurality of local points of contact, each one of the plurality of local points of contact associated with a different respective location at which the event may have been detected.

17. The method of claim 15, wherein the event includes at least one of a nuclear event, a radiological event, a biological event, a chemical event, an explosion event, and a naturally occurring event.

18. The method of claim 15, further including:

receiving at least one validation signal associated with the event from a remote location; and combining the at least one event signal and the at least one validation signal in order to generate a validated at least one event signal, wherein the intelligent response signal is generated in response to the validated at least one event signal.

19. The method of claim 15, further including: analyzing the at least one event signal to determine a characteristic of the event.

20. The method of claim 15, further including normalizing first information associated with a first event signal with second information associated with a second event signal so that the first and second information can be compared.

21. The method of claim 15, further including correlating a first event signal with one or more other event signals.

22. The method of claim 15, further including:

acquiring the related data associated with the, wherein the related data includes at least one of: infrastructure capacity data, emergency response capabilities data, local point of contact data having a plurality of local points of contact associated with a plurality of respective different locations at which the event may have been detected, regional point of contact data or national point of contact data; and data fusing to identify a relationship between the at least one event signal and the related data.

23. The method of claim 15, wherein at least one of the at least one event signal is a wireless event signal.

24. A system for event alert, comprising:

a plurality of event modules configured to detect an event and configured to generate at least one event signal associated with the event, wherein the event includes at least one of a nuclear event, a radiological event, a biological event, a chemical event, an explosion event, or a naturally occurring event; and a command center configured to receive the at least one event signal and configured to generate an intelligent response signal associated with the event, wherein the intelligent response signal includes at least one of a response instruction associated with the event or related data associated with the event, wherein the command center is also configured to communicate the intelligent response signal to at least one of a national first responder, a regional first responder, or a local first responder selected from among a plurality of local responders, each one of the plurality of local responders associated with a different respective location at which the event may have been detected, wherein the response instruction comprises an instruction indicative of how one or more people should respond or how one or more people should not respond in order to mitigate harm that could be caused by the event, and wherein the command center includes at least one of:

a validation processor configured to receive the at least one event signal and configured to receive a respective at least one validation signal associated with the event and configured to compare the at least one event signal with the at least one respective validation signal in order to generate a validated at least one event signal, wherein the intelligent response signal is generated in response to the validated at least one event signal, an event analysis processor configured to determine a characteristic of the event, a data normalization processor configured to normalize first information associated with a first event signal with second information associated with a second event signal so that the first and second information can be compared, or an event correlation processor configured to correlate the first event signal with one or more other event signals, at least one database having the related data therein, the at least one database comprising at least one of: an infrastructure capacity database, an emergency response capabilities database, a local point of contact database, a regional point of contact database, or a national point of contact database; and a database fusion processor configured to identify a relationship between the at least one event signal and the related data.

25. The system of claim 24, wherein the command center is relocatable to another location such that the other locations can perform functions of the central command center.

26. The system of claim 24, wherein at least one of the regional command center or the local command center is configured to generate a response signal for communication to at least one of the regional first responder or the local first responder, respectively.

* * * * *

UNITED STATES PATENT AND TRADEMARK OFFICE

CERTIFICATE OF CORRECTION

PATENT NO. : 7,634,361 B2
APPLICATION NO. : 11/126560
DATED : December 15, 2009
INVENTOR(S) : Michael E. Levesque et al.

It is certified that error appears in the above-identified patent and that said Letters Patent is hereby corrected as shown below:

Column 1, line 36 delete “all the” and replace with --all of the--.

Column 3, line 4 delete “the an” and replace with --an--.

Column 3, line 31 delete “an detection” and replace with --a detection--.

Column 3, line 59 delete “let is” and replace with --let it--.

Column 3, line 61 delete “one of more” and replace with --one or more--.

Column 8, line 35 delete “center” and replace with --centers--.

Column 9, line 23 delete “in control” and replace with --in the central--.

Column 11, line 33 delete “signal” and replace with --signals--.

Column 12, line 9 delete “transmitters” and replace with --transmitter--.

Column 12, line 17 delete “sensor” and replace with --sensors--.

Column 15, line 59 delete “event and” and replace with --event; and--.

Column 16, line 39 delete “the,” and replace with --the event,--.

Signed and Sealed this

Thirteenth Day of April, 2010

David J. Kappos
*Director of the United States Patent and Trademark Office*